US008825804B2

(12) United States Patent
Vaitl (10) Patent No.: US 8,825,804 B2
(45) Date of Patent: Sep. 2, 2014

(54) METHOD AND SYSTEM FOR AVOIDING AN UNINTENTIONAL TIME-OUT FOR COMMUNICATIONS IN A CLIENT-PROXY-SERVER ENVIRONMENT

(75) Inventor: Eric Vaitl, Lawrenceville, GA (US)

(73) Assignee: International Business Machines Corporation, Armonk, NY (US)

( * ) Notice: Subject to any disclaimer, the term of this patent is extended or adjusted under 35 U.S.C. 154(b) by 2740 days.

(21) Appl. No.: 11/342,331

(22) Filed: Jan. 26, 2006

(65) Prior Publication Data

US 2006/0195589 A1 Aug. 31, 2006

Related U.S. Application Data

(60) Provisional application No. 60/647,276, filed on Jan. 26, 2005.

(51) Int. Cl.
*H04L 29/08* (2006.01)
(52) U.S. Cl.
CPC .............. *H04L 67/14* (2013.01); *H04L 67/28* (2013.01)
USPC ........................... 709/219; 709/231; 709/227
(58) Field of Classification Search
USPC ................................................. 709/219, 218
See application file for complete search history.

(56) References Cited

U.S. PATENT DOCUMENTS 5,557,748 A * 9/1996 Norris ........................... 709/220
6,650,621 B1 * 11/2003 Maki-Kullas ................. 370/238
6,862,627 B1 * 3/2005 Cheshire ....................... 709/227
7,089,302 B1 * 8/2006 Churchyard et al. ......... 709/224
2005/0229237 A1 * 10/2005 Xie et al. ........................ 726/1

(Continued)

FOREIGN PATENT DOCUMENTS

JP 2000267894 A * 9/2000 .............. G06F 11/30
JP 2003-018181 1/2003

(Continued)

OTHER PUBLICATIONS

Meyer et al., "Decentralized Control and Intelligence in Network Management," Proceedings of the Fourth International Symposium on Integrated Network Management, 1995, 14 pages. (See pp. 7-8, paragraph 3.0).

(Continued)

*Primary Examiner* — Melanie Jagannathan
*Assistant Examiner* — Jason Harley
(74) *Attorney, Agent, or Firm* — King & Spaulding (57) ABSTRACT

When conducting anti-virus, anti-spam, or other content filtering on a gateway device, data traffic is run through a proxy that completes a "fetch-scan-forward" operation of the data traffic exchanged between a server and a client. During the transmission of data from the server to the proxy and while the gateway is scanning the data, the client is idle and in danger of timing-out and aborting the data request to be received from the proxy. To prevent this, the proxy sends an intervention message, typically in the form of an extension header file, continuation response, and/or innocuous command, in advance of the client-side time-out. Alternatively, during the transmission of data from the client to the proxy and while the gateway is scanning the data, the server is idle and in danger of timing-out. A proxy sends an intervention message, in the form of an innocuous command, in advance of the server-side time-out.

17 Claims, 9 Drawing Sheets

(56) References Cited

U.S. PATENT DOCUMENTS

| | | |
|---|---|---|
| 2006/0085547 A1* | 4/2006 | Cormier .................. 709/227 |
| 2006/0168260 A1 | 7/2006 | Hinde et al. |
| 2006/0168262 A1* | 7/2006 | Frazer ..................... 709/230 |
| 2007/0206621 A1 | 9/2007 | Plamondon et al. |

FOREIGN PATENT DOCUMENTS

| | | |
|---|---|---|
| JP | 2003-018235 | 1/2003 |
| WO | WO-00/10278 | 2/2000 |
| WO | WO-02/101516 | 12/2002 |
| WO | WO-2006/001086 | 1/2006 |

OTHER PUBLICATIONS

Virus Scanning, http://frox.sourceforge.net/doc/FAQ-5.html, 1-pg.

./src/vscan.c, Patch: Additional logging in NTP, Copyright © 2000, James Hollingshead, available at http://www.bollo.org/cgi-bin/darcs?frox*, 7-pgs.

* cited by examiner

METHOD AND SYSTEM FOR AVOIDING AN UNINTENTIONAL TIME-OUT FOR COMMUNICATIONS IN A CLIENT-PROXY-SERVER ENVIRONMENT

RELATED PATENT APPLICATIONS

Applicants claim priority under 35 U.S.C. §119 to U.S. Provisional Patent Application Ser. No. 60/647,276, entitled "Method and System for Avoiding an Unintentional Time-Out for Communications in a Client-Proxy-Server Environment," filed on Jan. 26, 2005. The complete disclosure of the above-identified provisional patent application is hereby fully incorporated herein by reference.

FIELD OF THE INVENTION

The invention relates generally to computer systems and computer networks. More particularly, the invention relates to a system and method for avoiding an unintentional time-out for communications in a client-proxy-server environment.

BACKGROUND

When typically conducting anti-virus, anti-spam, or other content filtering on a gateway device, the traffic stream is run through a proxy that completes a "fetch-scan-forward" operation of the data traffic exchanged between a server and client. Because anti-virus software and anti-spam checking software often only work on complete data files, the conventional option of completing stream filtering of data traffic is not available for these applications. Instead, a proxy, or software module, first scans the data received from the server for intended delivery to the client and, upon completing the scan, forwards the data to the client or blocks the data communication in the event of a detected trigger event, such as a detected virus or a security violation.

During the fetch and scan phases of a fetch-scan-forward cycle, little or no data is transmitted to the client during server-proxy communications. This presents a problem because many clients have relatively short time-out cycles. Therefore, in the absence of a data communication to the client, the client may time-out and abort a data request transmitted to the server.

In an attempt to address this issue, others have recognized this type of data communication problem and provided alternative solutions. One prior solution is to "trickle-out" some of the original data received from the server to the client before the complete original data set has been scanned at the gateway. Another prior solution is to establish a time-out period at the proxy and, if this time-out is reached, the original data is streamed to the client to prevent a client-side time-out. In both of these solutions, the client is at risk of a possible virus infection or security violation if the data forwarded by the proxy to prevent the client-side time-out carries a virus or other form of unwanted software behavior.

Furthermore, during the fetch and scan phases of a fetch-scan-forward cycle, if a slow data communication link exists between the proxy and the client, the server may be idle for a long period, thereby resulting in an unintentional server-side time-out.

Accordingly, there remains a need for a method or system that can prevent client-side and server-side time-outs while conducting anti-virus, anti-spam, or other content filtering on a gateway. Furthermore, there is a need in the art for a method or system that can prevent client-side and server-side time-outs without transmitting original data and allowing a possible virus infection or security violation to reach the client and/or.

SUMMARY OF THE INVENTION

The invention satisfies the above-described and other needs by providing a system and method for avoiding an unintentional client-side and server-side time-out for Internet protocol communications in a client-proxy-server environment. Significantly, the invention does not rely on the transmission of unscanned original data to prevent client-side and server-side time-outs. Instead of a transmission of original data, the proxy can forward intervention messages, typically including extension header fields, continuation responses, and/or innocuous commands, in the data stream to the client and server. The ability to transfer these intervention messages, instead of original data, can prevent unintentional client-side and server-side time-outs, and can prevent unscanned data that is possibly infected with a virus or security violation from reaching the client and/or server.

According to one aspect of the invention, an unintentional time-out for POP3 protocol communications in a client-proxy-server environment can be avoided by transmitting intervention messages from a POP3 proxy to a client to prevent a client-side time-out.

For another aspect of the invention, an unintentional time-out for HTTP protocol communications in a client-proxy-server environment can be avoided by transmitting intervention messages from a HTTP proxy to a client to prevent a client-side time-out.

For another aspect of the invention, an unintentional time-out for FTP protocol communications in a client-proxy-server environment can be avoided by transmitting intervention messages from a FTP proxy to a client to prevent a client-side time-out.

For another aspect of the invention, and similar to the client-side time-out problem, a proxy can periodically send intervention messages to the server to reset the server-side timer, thereby preventing the server-side time-out.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

The invention provides a system and method for avoiding an unintentional time-out for multiple Internet protocol communications in a client-proxy-server environment without transmitting unscanned original data to prevent the time-outs. Instead of original data, the proxy can forward intervention messages in the data stream to the client. The ability to transfer intervention messages, such as extension header fields, continuation responses, and/or innocuous commands, instead of original data, can prevent unintentional time-outs. Furthermore, the transmission of intervention messages can prevent data that is possibly infected with a virus or security violation from reaching the client or server.

As discussed, the invention prevents unintentional time-outs without transferring original unscanned data. Transferring any amount of original data, even small amounts, to a client or server prior to scanning the data for security violations, such as viruses, can pose the risk of a possible virus or unwanted software behavior reaching the client or server. Therefore, the invention transmits only intervention messages that do not contain original data, to prevent the unintentional time-outs. Preferably, original data is only transmitted to the client or server after it has been scanned to determine whether the data contains a security violation.

In a variety of Internet protocols, the data sent from a server to the client can include headers comprising a set of line terminated fields. In the invention, an intermediary computer such as a proxy conducting "fetch-scan-forward" operations can add additional intervention messages, such as extension header fields, continuation responses, and/or innocuous commands, to the data stream that are effectively "ignored" upon receipt by the client. Unintentional time-outs can be prevented by sending the client or server the intervention messages, rather than original data, from the proxy at predetermined times during a "fetch-scan-forward" operation for data exchanges between a server and a client.

The client-side timer, as well as the server-side timer, are normally reset whenever the client or server receives a line of data traffic. Therefore, as long as the proxy sends the intervention message to the client or server within a time period shorter than the client or server's time-out period, the client or server can be kept waiting almost indefinitely for the completion of the fetch and scan data operation at the proxy. Thus, intervention messages are messages created by the proxy that contain one or more lines of data traffic that are transmitted to the client or server to reset the timers. However, the intervention messages do not contain original data that has been requested by the client or server. Instead the intervention messages contain lines of data traffic that are effectively ignored by the client or server, and only serve the purpose of resetting the client or server timer.

Traffic flow diagrams are provided to illustrate exemplary data flows between the server, proxy, and client to prevent unintentional time-outs for certain representative communications protocols, including the POP3, HTTP, and FTP protocols. One of ordinary skill in the art will appreciate that an actual data capture of a traffic flow could comprise, at a minimum, additional acknowledgement ("ACK") packets and reflect other minor differences that are not required for disclosure of the exemplary implementations of the invention.

Furthermore, one of ordinary skill in the art will appreciate that the invention can be extended to cover multiple Internet protocols, besides the POP3, HTTP, and FTP protocols. By way of the teachings of this representative example, one of ordinary skill in the art will recognize that the invention can be extended to cover the IMAP and SMTP Internet protocols.

Figure 1:
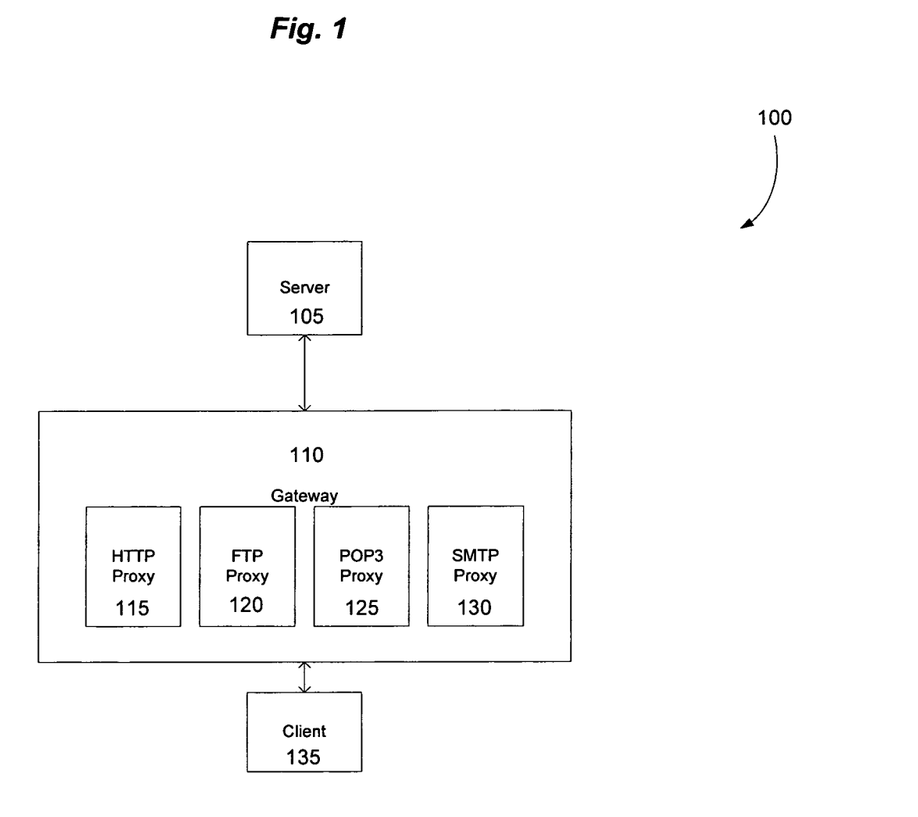
FIG. 1 is a block diagram illustrating an exemplary operating environment for implementation of various exemplary embodiments of the invention.

FIG. 1 a block diagram 100 illustrating an exemplary operating environment for implementation of various exemplary embodiments of the invention. The exemplary operating environment comprises a server computer 105, gateway 110, and a client 135. Data traffic exchanged between the server 105 and the client 135 passes through the gateway 110 which is positioned in-line to monitor and process the data traffic. Residing on the gateway 110 are multiple software modules known as proxies that complete a "fetch-scan-forward" operation of the data traffic exchanged between the server 105 and the client 135. The proxies located on the gateway 110 can comprise a HTTP proxy 115, FTP proxy 120, POP3 proxy 125, and SMTP proxy 130.

In an exemplary operating environment, the gateway 110 applies to the hardware device, such as a firewall or router appliance, that is located on a path between a client 135 and a server 105. The proxies, or modules, are components of the gateway 110 implemented using software. The proxies are responsible for transmitting intervention messages to the client 135 and server 105 and for conducting the scanning of data received from the client 135 and server 105. One of ordinary skill in the art will recognize that the gateway 110 and the proxies 115, 120, 125, 130 perform other functions beyond what is described here that are not applicable to the invention.

In an exemplary embodiment of the invention, the gateway 110 can operate either in a layer 2 environment, such as a transparent firewall or bridge device, or a layer 3 environment, such as a firewall or router. In both environments, the gateway device 110 will have multiple interfaces and data traffic will be received on one interface, be processed by one of the proxies 115, 120, 125, 130 and be transmitted out the same or another interface.

In an alternative exemplary embodiment, the invention can be implemented on a single homed edge device (i.e. one interface) where data traffic is received on a single interface, processed by one of the proxies 115, 120, 125, 130, and sent back out the same interface.

The proxies 115, 120, 125, 130 can be either transparent or non-transparent. Transparent proxies require no client reconfiguration. The gateway device 110 intercepts the data traffic on a standard port and redirects it to the one of the proxies 115, 120, 125, 130. Non-transparent proxies require that each client behind the gateway be configured to point at the specific address and port location that the proxy is listening on.

Figure 2:
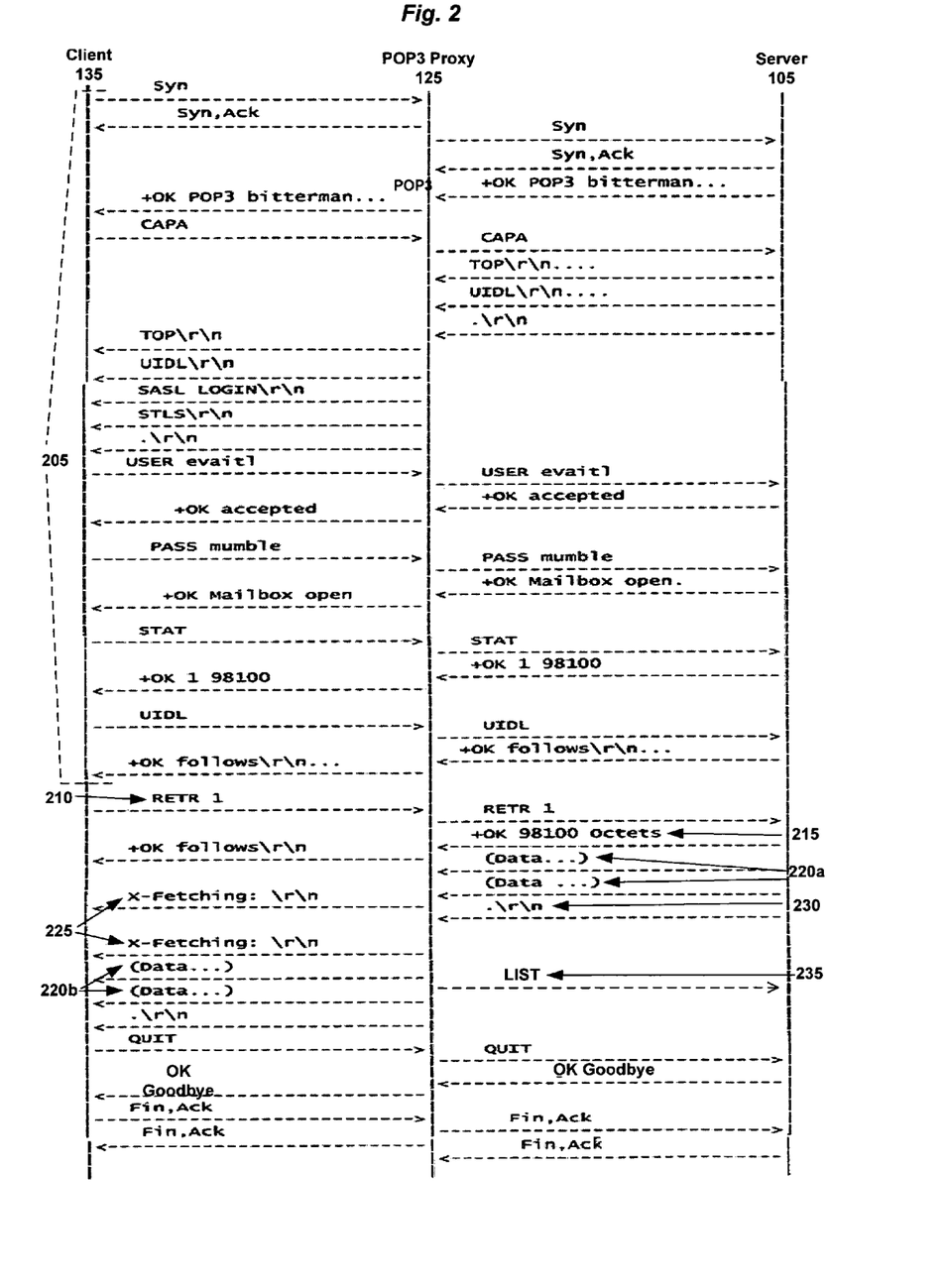
FIG. 2 is a traffic flow diagram that illustrates the data flows between the server, proxy and client to prevent unintentional time-outs for the POP3 protocol in accordance with an exemplary embodiment of the invention.

FIG. 2 is a traffic flow diagram that illustrates the exemplary data traffic flows between the server 105, POP3 proxy 125, and client 135 to prevent unintentional time-outs for the POP3 protocol in accordance with an exemplary embodiment of the invention. In FIG. 2, initial communication operations 205 are completed between the client 135, POP3 proxy 125, and server 105. Subsequently, the client 135 issues a Retrieve (RETR 1) command 210 to the POP3 proxy 125 to retrieve the first data message stored at the server 105. In turn, the POP3 proxy 125 forwards the Retrieve command 210 to the server 105. The server 105 responds to the Retrieve command 210 by sending the POP3 proxy 125 a confirmation response 215 confirming receipt of the Retrieve command 210 and advising that the server 105 will send a certain number of data octets. As represented in this example, the confirmation response 215 indicates the server 105 will send 98,100 octets for the first data transfer, as indicated by the "(+OK 98100 octets)" response in FIG. 2. The server 105 then sends data 220a to the POP3 proxy 125, as indicated by the "(Data . . . )" response in FIG. 2.

During predetermined times of the transmission of data 220a from the server 105 to the POP3 proxy 125, the POP3 proxy 125 transmits at least one intervention message, in the form of an extension header field 225 to the client 135 to prevent the client 135 from timing out and prematurely terminating the data request sequence. The extension header field 225 is transmitted prior to a client-side time-out. For example, the POP3 proxy 125 can send "X-[Fetching:]\r\n" 225 to the client 135 to complete the communication of a representative extension header. The extension header field 225 is followed by a carriage return "\r" and line feed "\n".

The transmission of extension header fields operate as intervention messages as the client 135 effectively ignores the extension header field 225. Furthermore, the extension header field 225 is treated by the client 135 as part of the message header that has no effect on the client 135 other than resetting the client timer. In addition, the extension header field 225 does not contain any of the original data traffic 220a that was requested from the server 105 by the client 135. The absence of original data traffic 220a in the extension header field 225 prevents any potential viruses or security violations from reaching the client 135.

In response to receiving the extension header field 225, the client 135 responds by resetting its time-out timer because a typical client timer is reset whenever the client 135 receives a line of data traffic. The POP3 proxy 125 sends the X-Fetching extension header field 225 to the client 135 every "ppop3d.slow_streaming_time-out" seconds. This time-out parameter is set to have a shorter time period that the idle timer reset period of the client 135. For many conventional client 135, the time-out period is 30 seconds, so the period for sending the extension header from the POP3 proxy 125 to the server 105 should be less than that time-out period, say 25 seconds, to force a reset of the client-side timer.

Extension header fields 225 can be sent from the POP3 proxy 125 to the client 135 during the time the POP3 proxy 125 is receiving the requested data traffic 220a from the server 105. When all requested data traffic 220a is received from the server 105, the server 105 sends a ".\r\n" transmission 230 from the server 105 to the POP3 proxy 125.

After all the requested data traffic 220a is received from the server 105, the POP3 proxy 125 completes a scan of the requested data traffic 220a. While the POP3 proxy 125 completes a scan of the requested data traffic 220a, the POP3 proxy 125 continues to transmit intervention messages, in the form of an extension header field 225, to the client 135 prior to a client time-out. The transmission of the extension header field 225 resets the client-side timer and prevents the client 135 from timing out and prematurely terminating the data request sequence.

After completing a scan of the requested data traffic 220a, if the POP3 proxy 125 does not detect a security violation or virus, it will then transmit the data traffic 220b to the client 135. However, if the POP3 proxy 125 detects a security violation or virus, the POP3 proxy 125 can take a blocking action and send a text message warning about a possible virus or a detected trigger event, such as a security violation or detected malware.

Along with preventing client-side time-outs, the exemplary embodiment of the invention for the POP3 protocol can prevent server-side time-outs as well. Typically, server-side time-outs are not an issue for the POP3 protocol emails are usually small in size and the server-side time-outs are set at five minutes. However, to prevent server-side time-outs for a POP3 protocol, the POP3 proxy 125 sends an innocuous, or harmless, command, such as the POP3 "LIST" command 235, to the server 105 to prevent a server-side time-out while the server 105 is idle.

The transmission of innocuous commands operate as intervention messages because in response to receiving the innocuous commands, the server 105 resets its time to prevent a server time-out. Furthermore, the innocuous command is effectively harmless to the server or to any of the other communications involved in the "fetch-scan-forward" process. Therefore, while the innocuous command may solicit a response from server 105, it will not affect the transmission of the requested data or the scanning of the requested data for viruses or security violations, as the command is unrelated to these functions.

In this example, the POP3 "LIST" command 235 calls for the server 105 to returns a list of all available messages. In response, the server will transmit a list of all available messages to the POP3 proxy 125 which will effectively ignore this response. In addition to these features, the innocuous command does not contain any of the original data traffic 220a that was requested from the server 105 by the client 135. The absence of original data traffic 220a in the extension header field 225 prevents any potential viruses or security violations from reaching the server 105.

As illustrated in FIG. 2, the "LIST" command 235 is transmitted by the POP3 proxy 125 to the server 105 at predetermined times to prevent the server 105 from entering the idle state during the communication of the scanned original data 220b from the POP3 proxy 125 to the client 135. The period for sending this innocuous command should be smaller than the typical idle time-out period for the server 105 to support a timely reset of the server 105 side timer and to prevent an unintentional server-side time-out condition. One of ordinary skill in the art will appreciate that other innocuous commands, such as different POP3 commands such as "STAT" or "NOOP", are suitable for the timer reset function implemented by the POP3 "LIST" command 235 as represented in FIG. 2.

Figure 3:
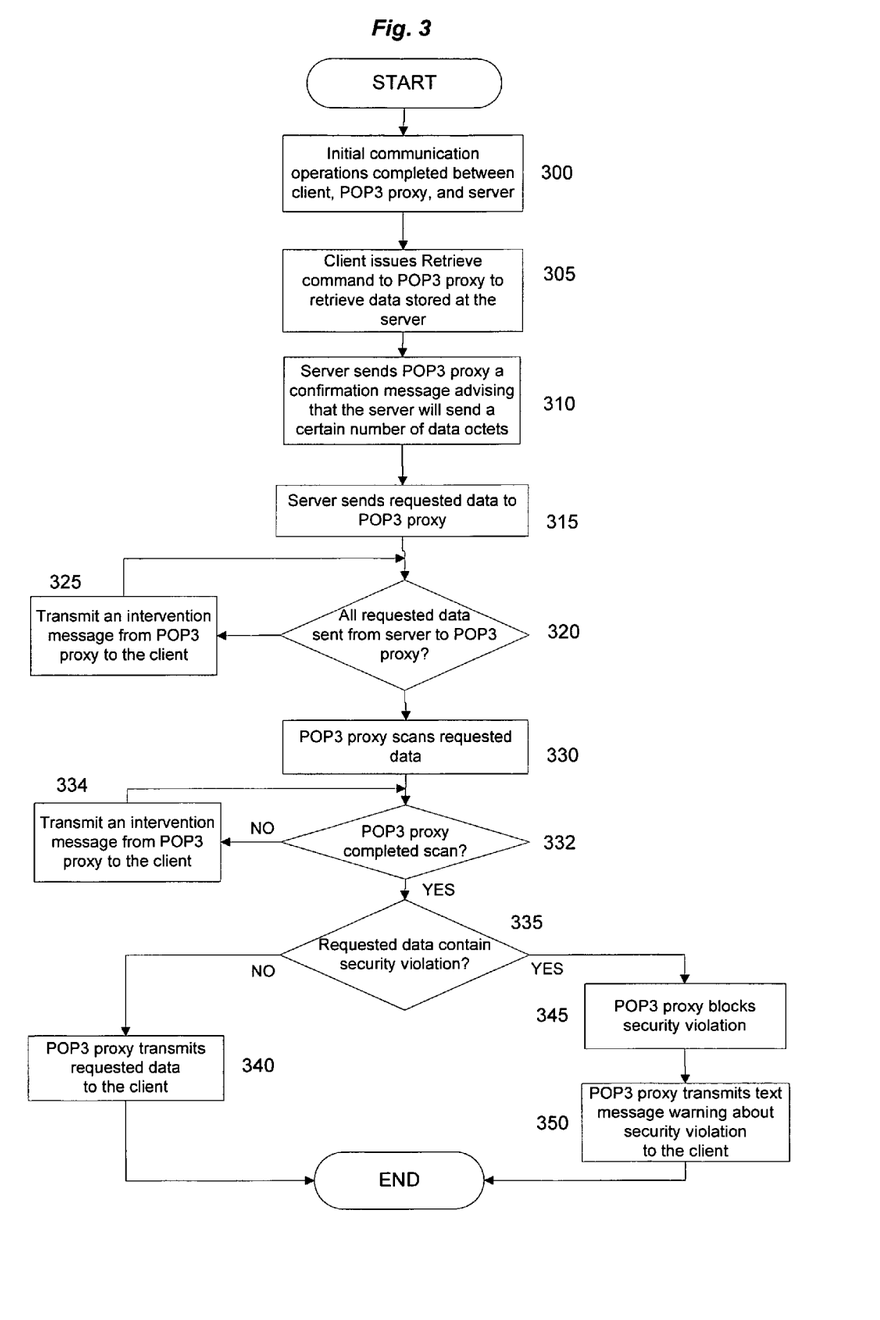
FIG. 3 is a logic flow diagram illustrating an exemplary method for avoiding unintentional time-outs for communications in a client-proxy-server environment for the POP3 protocol in accordance with an exemplary embodiment of the invention.

FIG. 3 is a logic flow diagram illustrating an exemplary method for avoiding unintentional time-outs for communications in a client-proxy-server environment for the POP3 protocol in accordance with an exemplary embodiment of the invention. In Step 300, initial communication operations 205 are completed between the client 135, POP3 proxy 125, and server 105. Subsequently, in Step 305, the client 135 issues a Retrieve command 210 to the POP3 proxy 125 to retrieve the data stored at the server 105, which is then forwarded to the server 105. In step 310, the server 105 responds to the receipt of the Retrieve command 210 by sending the POP3 proxy 125 a confirmation response 215 and advising that the server 105 will send a certain number of data octets. Then, in Step 315, the server 105 sends the requested data 220a to the POP3 proxy 125.

During Step 315, the server 105 continues to transmit the requested data 220a to the POP3 proxy 125. In Step 320, the proxy server 125 determines whether it has received all of the requested data 220a from the server 105. If all the requested data 220a has not been received from the server 105, the POP3 proxy 125 transmits an intervention message, in the form of an extension header field 225 to the client 135 at predetermined time intervals. The transmission of an extension header field 225 prevents the client 135 from timing out and prematurely terminating the data request sequence. In response to receiving the extension header field 225, the client's 135 time-out timer is reset because a typical client timer is reset whenever the client 135 receives a line of data traffic.

The process of transmitting an extension header field 225 from the POP3 proxy 125 to the client 135 in Step 325 continues until the POP3 proxy 125 has received all requested data traffic 220a from the server 105 for communication to the client 135 as determined in Step 320. After all the requested data traffic 220a is received from the server 105, the POP3 proxy 125 completes a scan of the requested data traffic 220a in Step 330. The scan in Step 330 typically comprises an anti-virus, anti-spam, or other content filtering scan on the gateway 110.

In Step 332, the POP3 proxy 125 determines whether it has completed the scan of the requested data traffic 220a. If the POP3 proxy 125 has not completed the scan of the requested data traffic 220a, the POP3 proxy 125 will continue transmitting an extension header field 225 from the POP3 proxy 125 to the client 135 in Step 334. However, if the POP3 proxy 125 has completed the scan of the requested data traffic 220a, it will determine whether the requested data 220a contains a security violation in Step 335.

If the POP3 proxy 125 does not detect a security violation or virus in Step 335, it will transmit the data traffic 220b to the client 135 in Step 340. However, if the POP3 proxy 125 detects a security violation or virus, the POP3 proxy 125 can take a blocking action in Step 345 to prevent the security violation from reaching the client 135 and then send a text message warning about a possible virus or a detected trigger event, such as a security violation or detected malware, to the client 135 in Step 350.

Figure 4:
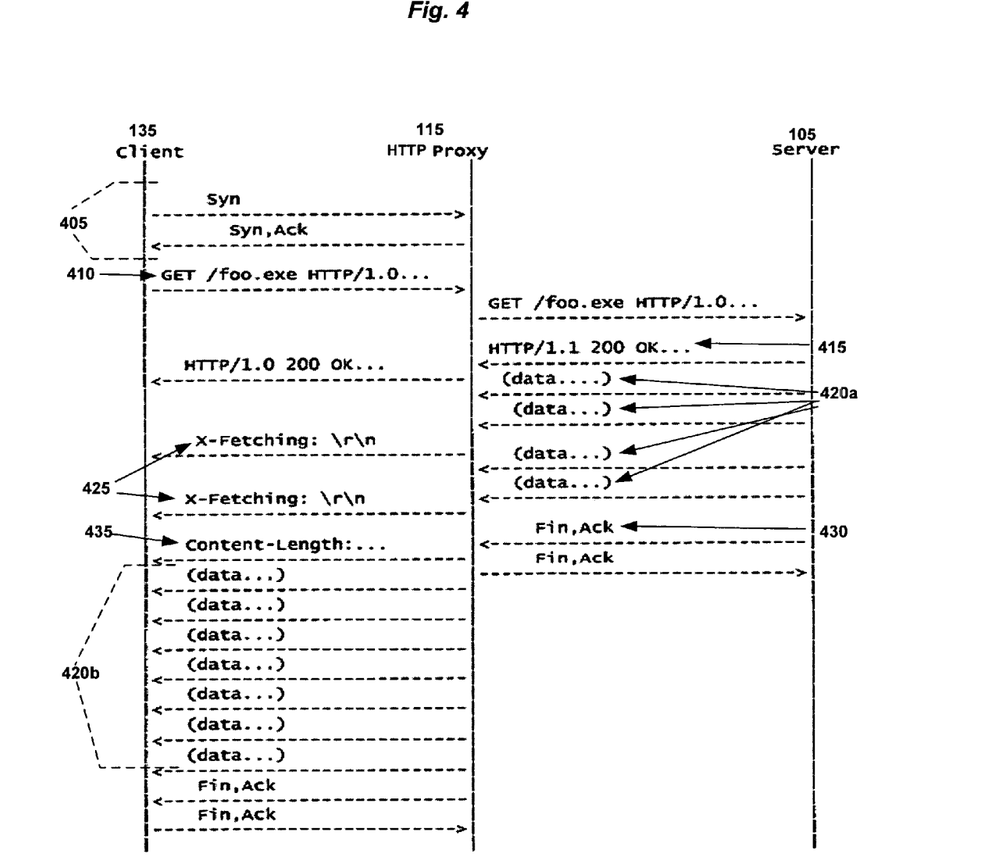
FIG. 4 is a traffic flow diagram that illustrates the data flows between the server, proxy and client to prevent unintentional time-outs for the HTTP protocol in accordance with an exemplary embodiment of the invention.

FIG. 4 is a traffic flow diagram that illustrates the data flows between the server, proxy and client to prevent unintentional time-outs for the HTTP Internet protocol in accordance with an exemplary embodiment of the invention. In FIG. 4, requests are transmitted from the client 135 to a HTTP proxy 115 or from the HTTP proxy 115 to the server 105. Furthermore, responses are transmitted from the server 105 to the HTTP proxy 115 or from the HTTP proxy 115 to the client 135. In the exemplary embodiment, requests and responses are messages, where the first line for a request is called a method and the first line of a response is called a status. Following this exemplary request/response model, a header typically follows a method or status line. Each header typically comprises a set of fields, where the set is typically configured with one per line. A header can be terminated by a blank line. Header lines can be terminated by "\r\n". A request method typically looks like "method SP URI SP http-version\r\n" and a response status typically looks like "http-version SP code SP text\r\n".

One of ordinary skill in the art will understand that the traffic flow diagram of FIG. 4 reflects a client-side timer reset embodiment similar to the exemplary embodiment described above with respect to the POP3 protocol in FIG. 2. However, there are a couple of minor differences between the embodiments for these different protocols. For the POP3 protocol, the intervention messages, in the form of extension header fields, are sent by the POP3 proxy 125 to the client 135 before the requested data traffic and are placed at the front of the mail header as seen by the client 135. In contrast, for the HTTP protocol, the intervention messages, in the form of extra extension header fields, are mixed in with the standard HTTP header fields.

Referring to the HTTP traffic flow diagram of FIG. 4, initial communication operations 405 are completed between the client 135, HTTP proxy 115 and server 105. Subsequently, the client 135 issues of a GET command 410 to the HTTP proxy 115 to retrieve data 420a maintained at the server 105. The GET command 410 is represented by "GET/foo.exe HTTP/1.0" in FIG. 4. In turn, the HTTP proxy 115 forwards the GET command 410 to the server 105.

In response to the receipt of the GET command 410, the server 105 sends the HTTP proxy 115 a confirmation response 415 confirming receipt of the GET command 410 and advising that the server 105 will send the requested data 420a. The confirmation response 415 is represented by "HTTP/1.1 200 OK" in FIG. 4. The confirmation response 415 is then transmitted by the HTTP proxy 115 to the client 135. The confirmation response 415 provides a partial header to the client 135. Typically, the confirmation response 415 has certain fields removed to preserve data security. After the server 105 transmits the confirmation response 415, the server 105 begins the process of sending data 420a to the HTTP proxy 115, as indicated by the "(data . . . )" data traffic flows in FIG. 4.

During predetermined times of the transmission of data 420a from the server 105 to the HTTP proxy 115, the HTTP proxy 115 transmits an intervention message, in the form of an extension header field 425, to the client 135 to prevent the client 135 from timing out and prematurely terminating the data request sequence. In an exemplary embodiment, the HTTP proxy 115 can send "X-[Fetching:]\r\n" to the client 135 to complete the communication of a representative extension header field 425. The representative extension header field 425 is followed by a carriage return "\r" and line feed "\n". The client 135 responds to the extension header field 425 by resetting its idle timer because a typical client 135 timer is reset whenever the client 135 receives a line of data traffic. For many conventional clients 135, the time-out period is 30 seconds, so the period for sending the extension header field 425 from the HTTP proxy 115 to the server 105 should be less than that time-out period, say 25 seconds, to force a reset of the client-side timer. For the HTTP protocol, these extension header fields can be mixed in with the normal HTTP header fields, instead of stacking the fields at the front of the headers seen by the client 135, as typically done for the exemplary POP3 embodiment.

The process of sending an extension header 425 from the HTTP proxy 115 to the client 135 continues until the HTTP proxy 115 has received all requested data traffic 420a from the server 105 for communication to the client 135. When all requested data traffic 420a has been transmitted by the server 105, the server 105 sends a "Fin, Ack" transmission 430 to the HTTP proxy 115. After all the requested data traffic 420a is received from the server 105, the HTTP proxy 115 completes a scan of the requested data traffic 420a. Furthermore, as long as the HTTP proxy 115 is completing a scan of the requested data traffic 420a, the HTTP proxy 115 continues transmitting an intervention message, in the form of an extension header field 425, to the client 135 to prevent the client 135 from timing out.

Once the HTTP proxy 115 has completed its scan of the requested data, and no security violations or viruses are detected, the HTTP proxy 115 will transmit the data traffic "(data . . . )" 420b to the client 135. Prior to forwarding the original data 420b to the client 135, the HTTP proxy 115 sends a "Content-Length/Content Type" message 435 to the client 135 and terminates the header field. However, if the HTTP proxy 115 detects a security violation or virus, the HTTP proxy 115 can send a text message warning of the computer security violation or virus rather than transmitting the requested data 420b to the client 135.

Figure 5:
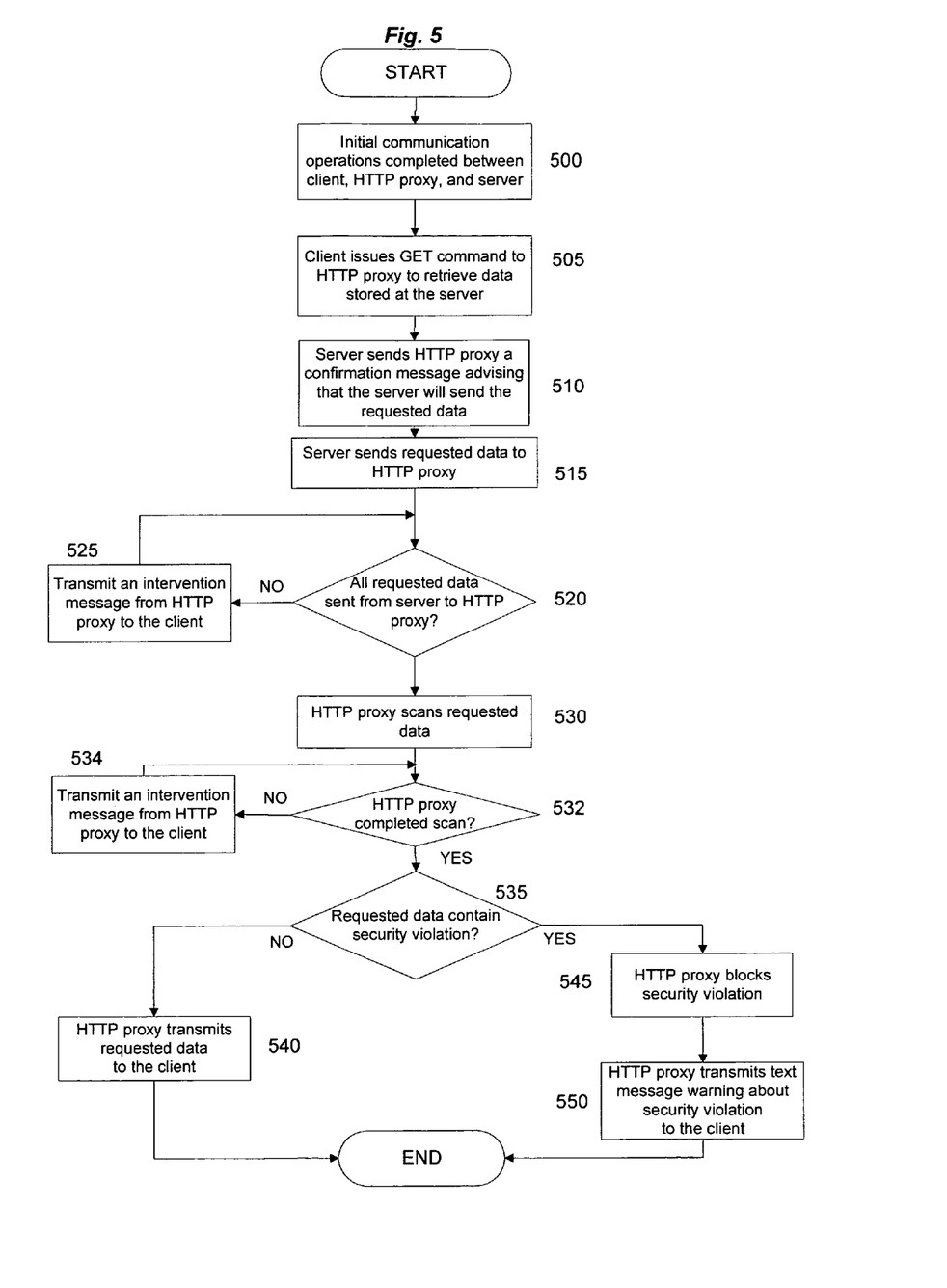
FIG. 5 is a logic flow diagram illustrating an exemplary method for avoiding unintentional time-outs for communications in a client-proxy-server environment for the HTTP protocol in accordance with an exemplary embodiment of the invention.

FIG. 5 is a logic flow diagram illustrating an exemplary method for avoiding unintentional time-outs for communications in a client-proxy-server environment for the HTTP protocol in accordance with an exemplary embodiment of the invention. In Step 500, initial communication operations 405 are completed between the client 135, HTTP proxy 115, and server 105. Subsequently, in Step 505, the client 135 issues a GET command 410 to the HTTP proxy 115 to retrieve the data stored at the server 105, which is then forwarded to the server 105. In step 510, the server 105 responds to the receipt of the GET command 410 by sending the HTTP proxy 115 a confirmation response 415 and advising that the server 105 will send the requested data. Then, in Step 515, the server 105 sends the requested data 420a to the HTTP proxy 115.

During Step 515, the server 105 continues to transmit the requested data 420a to the HTTP proxy 115. In Step 520, the HTTP proxy 115 determines whether it has received all of the requested data 420a from the server 105. If all the requested data 420a has not been received from the server 105, the HTTP proxy 115 transmits an intervention message, in the form of an extension header 425, to the client 135 at predetermined time intervals. The transmission of an extension header 425 prevents the client 135 from timing out and prematurely terminating the data request sequence. In response to receiving the extension header 425, the client's 135 time-out timer is reset because a typical client timer is reset whenever the client 135 receives a line of data traffic.

The process of transmitting an extension header field 425 from the HTTP proxy 115 to the client 135 in Step 525 continues until the HTTP proxy 115 has received all requested data traffic 420a from the server 105 for communication to the client 135 as determined in Step 520. After all the requested data traffic 420a is received from the server 105, the HTTP proxy 115 completes a scan of the requested data traffic 420a in Step 530. The scan in Step 530 typically comprises an anti-virus, anti-spam, or other content filtering scan on the gateway 110. The scan in Step 330 typically comprises an anti-virus, anti-spam, or other content filtering scan on the gateway 110.

In Step 532, the HTTP proxy 115 determines whether it has completed the scan of the requested data traffic 420a. If the HTTP proxy 115 has not completed the scan of the requested data traffic 420a, the HTTP proxy 115 will continue transmitting an extension header field 425 from the HTTP proxy 115 to the client 135 in Step 534. However, if the HTTP proxy 115 has completed the scan of the requested data traffic 420a, it will determine whether the requested data 420a contains a security violation in Step 535.

If the HTTP proxy 115 does not detect a security violation or virus, it will transmit the data traffic 420b to the client 135 in Step 540. However, if the HTTP proxy 115 detects a security violation or virus, the HTTP proxy 115 can take a blocking action in Step 545 to prevent the security violation from reaching the client 135 and then send a text message warning about a possible virus or a detected trigger event, such as a security violation or detected malware, to the client 135 in Step 550.

Figure 6:
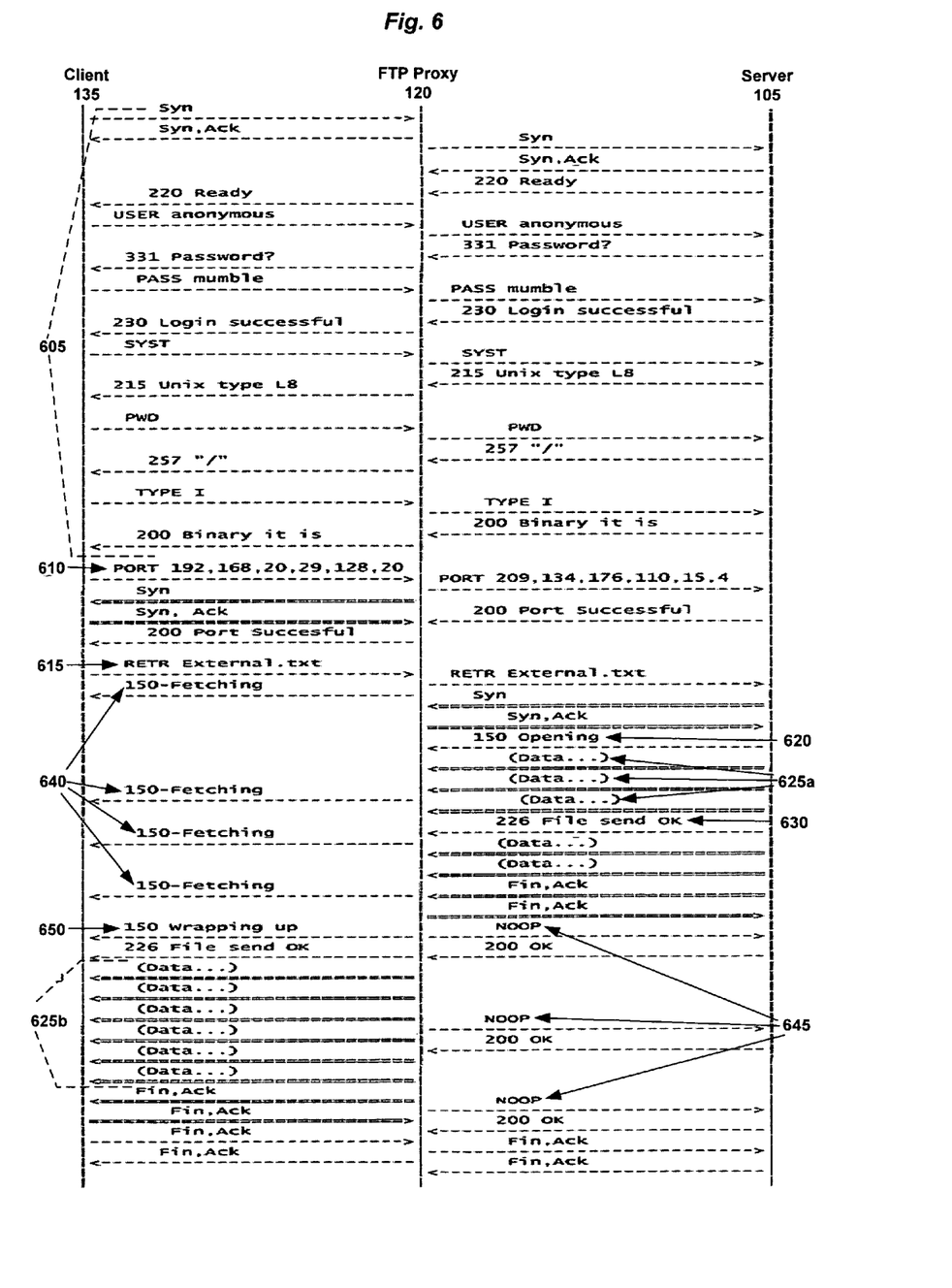
FIG. 6 is a traffic flow diagram that illustrates the data flows between the server, proxy and client to prevent unintentional time-outs for the FTP protocol in accordance with an exemplary embodiment of the invention.

FIG. 6 is a traffic flow diagram that illustrates the data flows between the server, proxy and client to prevent unintentional time-outs for the FTP protocol in accordance with an exemplary embodiment of the invention. To prevent unintentional time-outs on the client 135 side for FTP protocol communications, the FTP proxy 120 can transmit an intervention message, in the form of a continuation response, to the client 135 to reset the client 135 timer prior to a client-side time-out.

A continuation response message is effective in preventing time-outs because a single-line FTP response from the server 105 can be altered into a multi-line FTP response. This is done by adding a dash "-" immediately after the response code. By way of example, an FTP response of 150 Open could be altered to 150-Wait; 150-Wait; 150-Wait; 150 Open. In this example, each ";" represents a new line on the command channel that will be transmitted to the client 135. In this example, "Wait" is merely an arbitrary comment string inserted by the FTP proxy 120 and transmitted to the client 135.

For the FTP protocol, a client-side timer is typically reset whenever the client 135 receives either a block of data or a single line on the command channel. Therefore, the transmission of a continuation response will create multiple lines on the command channel to reset the client-side timer. Continuation responses are also effective because they do not contain any of the original data requested by the client 135; therefore, therefore there is no risk of a potential virus or security violation from reaching the client 135.

In FIG. 6, control operations are designated by "-------------" lines, while data traffic communications are designated by "===========" lines. Initially, FTP control-related communications 605 are completed between the client 135, FTP proxy 120 and server 105. The FTP proxy 120 is operative to forward to the server 105 control communications received from the client 135 and forward to the client 135 control communications received from the server 105.

After the FTP control-related communications 605 are completed, the client 135 issues a PORT command 610 to the FTP proxy 120. The FTP proxy 120 translates the PORT command 610 to determine the IP address to connect to and which port to open at that address. Next, the client 135 transmits a RETR command 615, represented by "RETR External.Txt" in FIG. 6, to request a communication of data from the server 105. The FTP proxy 120 receives the RETR command 615 and forwards the RETR command 615 to the server 105. In response to the RETR command 615, the server 135 sends the FTP proxy 120 a "150 Opening" response 620 on the control channel and a begins to send a stream of data "(Data . . . )" 625a on the data channel.

After the server completes the transfer of all data 625a, the server 105 sends a 226 response 630 to the FTP proxy 120 (represented in FIG. 6 by "226 File send OK") on the control channel to indicate that it has finished the data transfer. Although the traffic flow diagram appears to illustrate that the server 105 sends the "226" response 630 to the FTP proxy 120 prior to the completion of the data transfer, the diagram is only representative of how the server 105 and FTP proxy 120 are interleaved on the wire in the real world. FIG. 6 is not meant to imply that the server 105 sends the "226" response 230 before the end of the data is sent. Because the data transfer is typically large it will get buffered in the TCP/IP stacks of both the server 105 and FTP proxy 120. Therefore, the "226" response 630 will typically be sent on the wire before the end of the data is fully transmitted.

During the communication of responses and data from the server 105 to the FTP proxy 120, the FTP proxy 120 sends an intervention message, in the form of a continuation response 640, on the control channel to the client 135 at predetermined times to prevent the client-side timer from expiring. The continuation response is represented in FIG. 6 as multiple lines of "150-Fetching."

After receiving the "150 Opening" response 620 on the control channel from the server 105, the FTP proxy's 120 typical action would be to transmit a "150" response to acknowledge that the RETR command 615 was received. However, instead of immediately transferring the "150" response to the client 135, the FTP proxy 120 alters the response into a multi-line FTP response 640, as represented by "150-Fetching" 640 in FIG. 6. This FTP response 640 is transmitted while the client 135 is idle, and waiting for the server 105 to complete the data communication in response to the client's 135 data request. After all the data 625*a* is transmitted to the FTP proxy 120, the FTP proxy 120 transmits the "150" final response 650, as represented by "150 Wrapping Up" 650 in FIG. 6.

One of ordinary skill in the art will understand that the "150 Wrapping Up" response 650 is just the final reply to the "150-Fetching" continuation replies 640. All of these messages together constitute the single "150" reply from the server 105 in response to acknowledge that the RETR command 615 was received. Furthermore, one of ordinary skill in the art will understand that "Wrapping Up" and "Fetching" are just arbitrary comment strings that are inserted by the FTP proxy 120.

As explained above, the continuation response transmitted via the control line by the FTP proxy 120 to the client 135 is operative to reset an idle timer of the client 135. The period for sending the continuation response should be smaller than the typical idle time-out period for the client 135 to support a timely reset of the client-side timer and to prevent an unintentional client-side time-out condition.

After receiving the original data set 625*a* as requested by the client 135 from the server 105, the FTP proxy 120 scans the requested data 625*a*. Furthermore, as long as the FTP proxy 120 is completing a scan of the requested data traffic 625*a*, the FTP proxy 120 continues transmitting an intervention message, in the form of an extension header field 640, to the client 135 to prevent the client 135 from timing out.

If the FTP proxy 120 does not detect a security violation or virus, it will then transmit the scanned original data 625*b* to the client 135 via the data channel. However, if the FTP proxy 120 detects a security violation or virus during the scan, the FTP proxy 120 blocks the data and sends an advisory warning of a virus or security violation, typically in the form of a text message.

Along with preventing client-side time-outs, the exemplary embodiment of the invention represented in FIG. 6 can prevent server-side time-outs. The FTP proxy 120 performs this step by sending an innocuous command, in the form of an FTP command such as a "NOOP" or "STAT," to the server 105 to prevent a server-side time-out while the server 105 is idle. As illustrated in FIG. 6, the "NOOP" command 645 is transmitted by the FTP proxy 120 to the server 105 at predetermined times to prevent the server 105 from entering the idle state during the communication of the scanned original data 625*b* from the FTP proxy 120 to the client 135. The period for sending this FTP command should be smaller than the typical idle time-out period for the server 105 to support a timely reset of the server 105 side timer and to prevent an unintentional server-side time-out condition. One of ordinary skill in the art will appreciate that other FTP commands are suitable for the timer reset function implemented by the "NOOP" command 645 disclosed in FIG. 6, including the "STAT" and "LIST" commands.

Figure 7:
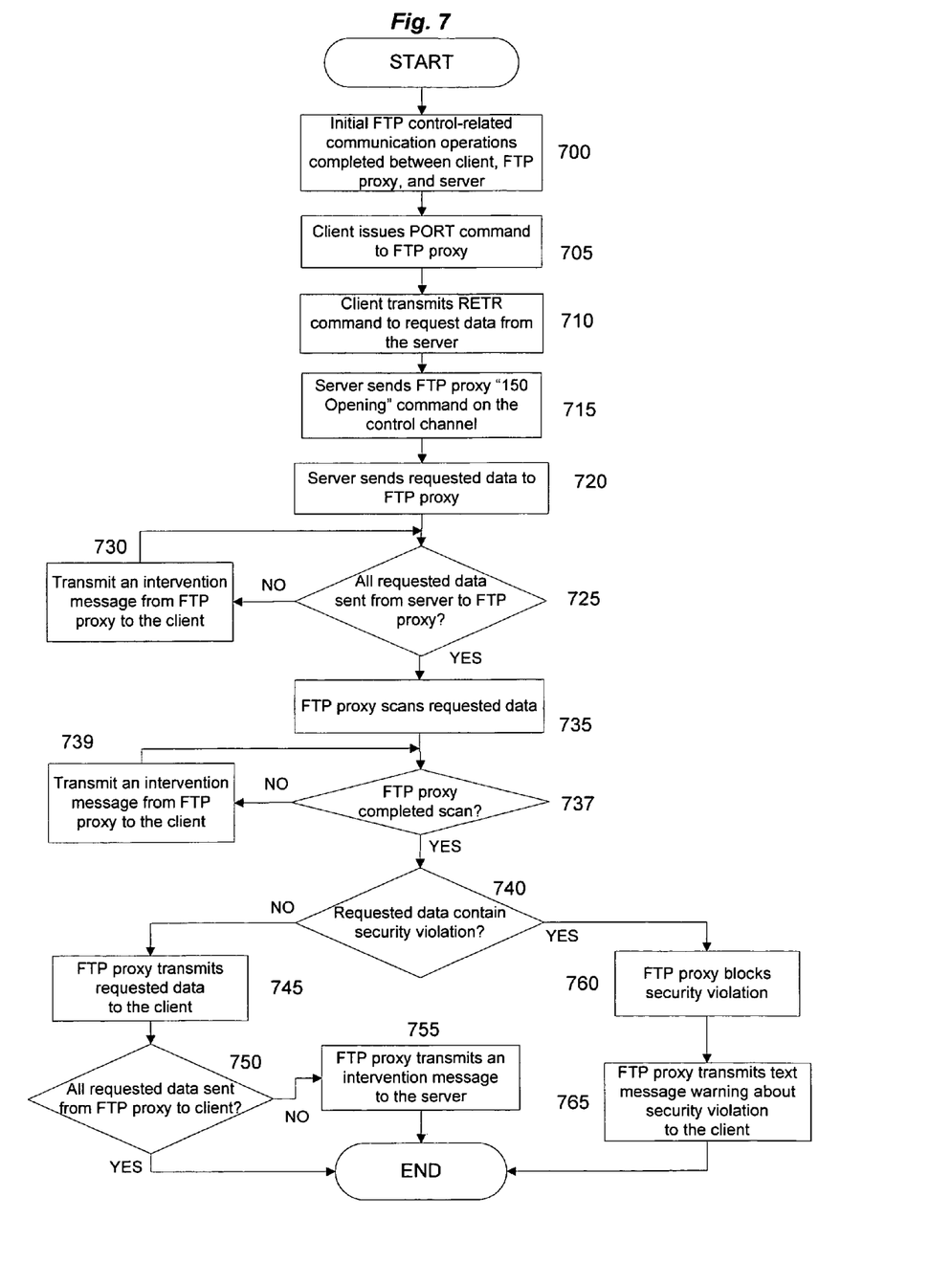
FIG. 7 is a logic flow diagram illustrating an exemplary method for avoiding unintentional time-outs for communications in a client-proxy-server environment for the FTP protocol in accordance with an exemplary embodiment of the invention.

FIG. 7 is a logic flow diagram illustrating an exemplary method for avoiding unintentional time-outs for communications in a client-proxy-server environment for the FTP protocol in accordance with an exemplary embodiment of the invention. In Step 700, initial FTP control-related communication operations 605 are completed between the client 135, FTP proxy 120, and server 105. Subsequently, in Step 705, the client 135 issues a PORT command 610 to the FTP proxy 120, which translates the PORT command 610 to determine the IP address to connect to and which port to open at that address. In step 710, the client transmits a RETR command 615 to the FTP proxy 120 to retrieve the data stored at the server 105, which is then forwarded to the server 105. In Step 715, the server 105 responds to the receipt of the RETR command 615 by sending the FTP proxy 120 a confirmation response 620 on the control channel. Then, in Step 720, the server 105 sends the requested data 625*a* to the FTP proxy 120.

During Step 720, the server 105 continues to transmit the requested data 625*a* to the FTP proxy 120. In Step 725, the FTP proxy 120 determines whether it has received all of the requested data 625*a* from the server 105. If all the requested data 625*a* has not been received from the server 105, the FTP proxy 120 transmits an intervention message, in the form of a continuation response 640 to the client 135 at predetermined time intervals. The transmission of a continuation response 640 prevents the client 135 from timing out and prematurely terminating the data request sequence. In response to receiving a continuation response 640, the client 135 responds by resetting its time-out timer because a typical client timer is reset whenever the client 135 receives a line of data traffic.

The process of transmitting a continuation response 640 from the FTP proxy 120 to the client 135 in Step 730 continues until the FTP proxy 120 has received all requested data traffic 625*a* from the server 105 for communication to the client 135 as determined in Step 725. After all the requested data traffic 625*a* is received from the server 105, the FTP proxy 120 completes a scan of the requested data traffic 625*a* in Step 735. The scan in Step 735 typically comprises an anti-virus, anti-spam, or other content filtering scan on the gateway 110.

In Step 737, the FTP proxy 120 determines whether it has completed the scan of the requested data traffic 625*a*. If the FTP proxy 120 has not completed the scan of the requested data traffic 625*a*, the FTP proxy 120 will continue transmitting an continuation response 640 from the FTP proxy 120 to the client 135 in Step 739. However, if the FTP proxy 120 has completed the scan of the requested data traffic 625*a*, it will determine whether the requested data 625*a* contains a security violation in Step 740.

If the FTP proxy 120 does not detect a security violation or virus, it will transmit the data traffic 625*b* to the client 135 in Step 745. If a slow data communication link exists between the FTP proxy 120 and the client 135, the server 105 may be idle for a long period, thereby resulting in an unintentional server-side time-out. Therefore, while the FTP proxy 120 transmits the requested data traffic 625*b* to the client 135 in Step 745, the FTP proxy 120 determines whether the all the requested data traffic 625*b* has been transmitted to the client 135. If all the requested data traffic 625*b* has not been transmitted to the client 135, the FTP proxy 120 sends an intervention message 645, in the form of an innocuous, or harmless, command such as the FTP "NOOP," "STAT," and/or "LIST" commands, to the server 105 in Step 755 to prevent a server-side time-out while the server 105 is idle. The innocuous FTP command 645 is transmitted by the FTP proxy 120 to the server 105 at predetermined times to prevent the server 105 from entering the idle state during the communication of the requested data traffic 625b from the FTP proxy 120 to the client 135.

However, if the FTP proxy 120 detects a security violation or virus in Step 740, the FTP proxy 120 can take a blocking action in Step 760 to prevent the security violation from reaching the client 135 and then send a text message warning about a possible virus or a detected trigger event, such as a security violation or detected malware, to the client 135 in Step 765.

Figure 8:
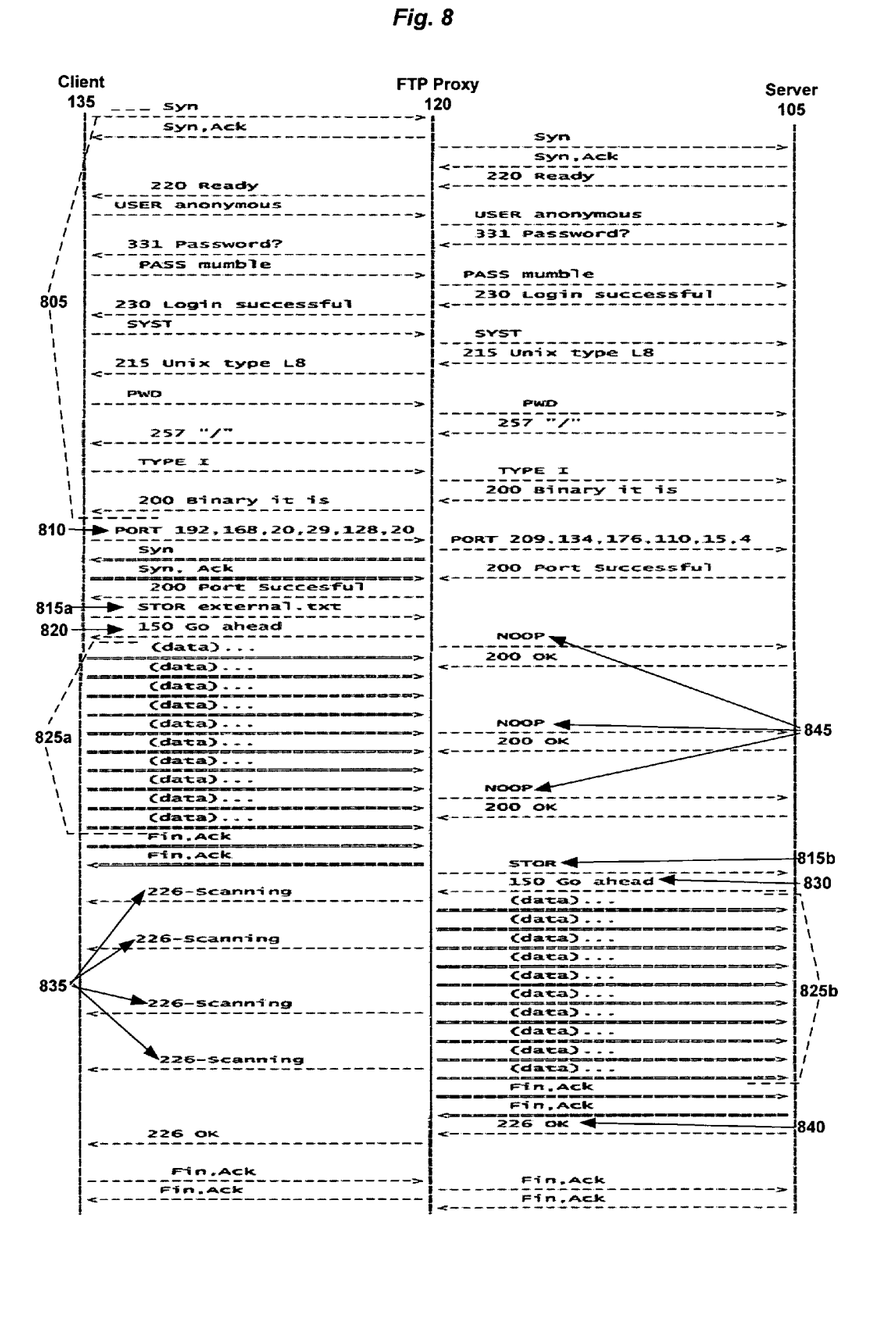
FIG. 8 is a traffic flow diagram that illustrates the data flows between the server, proxy and client to prevent unintentional time-outs for the FTP protocol in accordance with an alternative exemplary embodiment of the invention.

FIG. 8 is a traffic flow diagram that illustrates the data flows between the server, proxy and client to prevent unintentional time-outs for the FTP protocol in accordance with an exemplary embodiment of the invention. To prevent unintentional time-outs on the client 135 side for FTP protocol communications, the FTP proxy 120 can transmit an intervention message, in the form of a continuation response, to the client 135 to reset the client 135 timer prior to a client-side time-out.

A continuation response message is effective in preventing time-outs because a single-line FTP response from the server 105 can be altered into a multi-line FTP response. This is done by adding a dash "-" immediately after the response code. By way of example, an FTP response of 150 Open could be altered to 150-Wait; 150-Wait; 150-Wait; 150 Open. In this example, each ";" represents a new line on the command channel and "Wait" is merely an arbitrary comment string inserted the by the FTP proxy 120 and transmitted to the client 135.

For the FTP protocol, a client-side timer is typically reset whenever the client 135 receives either a block of data or a single line on the command channel. Therefore, the transmission of a continuation response will create multiple lines on the command channel to reset the client-side timer.

In FIG. 8, as in FIG. 6, control operations are designated by "-------------" lines, while data traffic communications are designated by "===========" lines. Initially, FTP control-related communications 605 are completed between the client 135, FTP proxy 120 and server 105. The FTP proxy 120 is operative to forward to the server 105 control communications received from the client 135 and forward to the client 135 control communications received from the server 105.

In this alternative exemplary embodiment, support is provided for the FTP commands of "STOR" and "STOU". The "STOR" command is used to store a file on a remote host, while the "STOU" command is used to store a file uniquely on a remote host with overlaying an existing file. This alternative exemplary FTP protocol embodiment includes a FTP proxy 120 that sends an intervention message, in the form of a continuation response to the client 135 during the communication of data from the server 105 to the FTP proxy 120 to prevent a client-side time-out during the idle period of the client 135. In contrast to the exemplary FTP embodiment of FIG. 6, a continuation response utilizing the FTP "150-" response cannot be used to reset the client-side timer because, for a STOR command, the client 135 does not start sending data until the 150 status completes. Therefore, the exemplary embodiment of FIG. 8 utilizes the FTP "226-" response to reset the client-side timer.

In FIG. 8, as in FIG. 6, control operations are designated by "-------------" lines, while data traffic communications are designated by "===========" lines. Initially, FTP control-related communications 805 are completed between the client 135, FTP proxy 120 and server 105. The FTP proxy 120 is operative to forward to the server 105 control communications received from the client 135 and forward to the client 135 control communications received from the server 105.

After the FTP control-related communications 805 are completed, the client 135 issues a PORT command 810 to the FTP proxy 120. The FTP proxy 120 translates the PORT command 810 to determine the IP address to connect to and which port to open at that address. Next, the client 135 transmits a STOR command 815a, represented by "STOR external.txt" in FIG. 6, to store data from the client 135 on the server 105. The "STOR external.txt" command 815a serves the purpose of notifying the server to open the file "external.txt" for writing and wait to receive data.

The FTP proxy 120 receives the STOR command 815a and acknowledges the command with a "150 Go Ahead" command 820 on the control channel. Subsequently, the client 135 begins to transmit a stream of data "(Data . . . )" 825a on the data channel to the FTP proxy 120. After all the original stream of data 825a is transmitted to the FTP proxy 120 from the client 135, the FTP proxy 120 transmits the STOR command 815b to the server 105. To acknowledge receipt of the STOR command 815b, the server 105 sends the FTP proxy 120 a "150 Go Ahead" command 830. If the FTP proxy 120 does not receive the "150 Go Ahead" command 830 from the server 105, the FTP proxy 120 aborts the transfer by sending a "426" command to the client 135.

After receiving the original data set 825a, the FTP proxy 120 scans the data 825a. As long as the FTP proxy 120 is completing a scan of the requested data traffic 825a, the FTP proxy 120 transmits an intervention message, in the form of a continuation response 835, to the client 135 to prevent client-side time-outs. If the FTP proxy 120 does not detect a security violation or virus, it will then transmit the scanned original data 825b to the server 105 via the data channel. The server 105 will then write the scanned original data 825b to the external.txt file.

However, if the FTP proxy 120 detects a security violation or virus during the scan, the FTP proxy 120 blocks the data and sends a new and different set of data that typically comprises a text message indicating that the original data 825a was found to contain a virus or security violation. This new data is written by the server 105 into the external.txt file, and the server 105 typically receives no indication that a virus was detected.

After receiving the "150 Go Ahead" response 830 on the control channel from the server 105, the FTP proxy 120 begins transmitting the scanned original data 825b to the server 105 via the data channel. However, during the transmission of the scanned original data 825b to the server 105, the client 135 is idle. Therefore, in this exemplary embodiment, during the communication of commands and data from the FTP proxy 120 to the server 105, the FTP proxy 120 sends an intervention message, in the form of a continuation response 835, to the client 135 to prevent client-side time-outs. The continuation response 835 is represented in FIG. 8 as multiple lines of "226-Scanning." This multi-line FTP response 835 is transmitted while the client 135 is idle and waiting for the server 105 to complete the data communication in response to the client's 135 data request.

After all the data 825b is transmitted from the FTP proxy 120 to the server 105, the sever 105 transmits a "226 OK" final response 840. When the FTP proxy 120 receives "226 OK" response 840, the FTP proxy 120 stops sending the continuation response 835. Finally, the FTP proxy 120 forwards the "226 OK" response 840 to the client 135 to acknowledge that all the data 825b was transmitted to the server 105 and written into the external.txt file.

Along with preventing client-side time-outs, the exemplary embodiment of the invention represented in FIG. 8 can prevent server-side time-outs as well. The FTP proxy 120 performs this step by sending an intervention message, in the form of an innocuous command 845, such as the FTP "NOOP" or "STAT" command, to the server 105 to prevent a server-side time-out while the server 105 is idle. As illustrated in FIG. 8, the FTP "NOOP" command 845 is transmitted by the FTP proxy 120 to the server 105 at predetermined times to prevent the server 105 from entering the idle state during the communication of the data 825a from the client 135 to the FTP proxy 120. The period for sending this FTP command should be smaller than the typical idle time-out period for the server 105 to support a timely reset of the server-side timer and to prevent an unintentional server-side time-out condition. One of ordinary skill in the art will appreciate that other innocuous commands are suitable for the timer reset function implemented by the FTP "NOOP" command 845 disclosed in FIG. 8, including the FTP "STAT" command.

Figure 9:
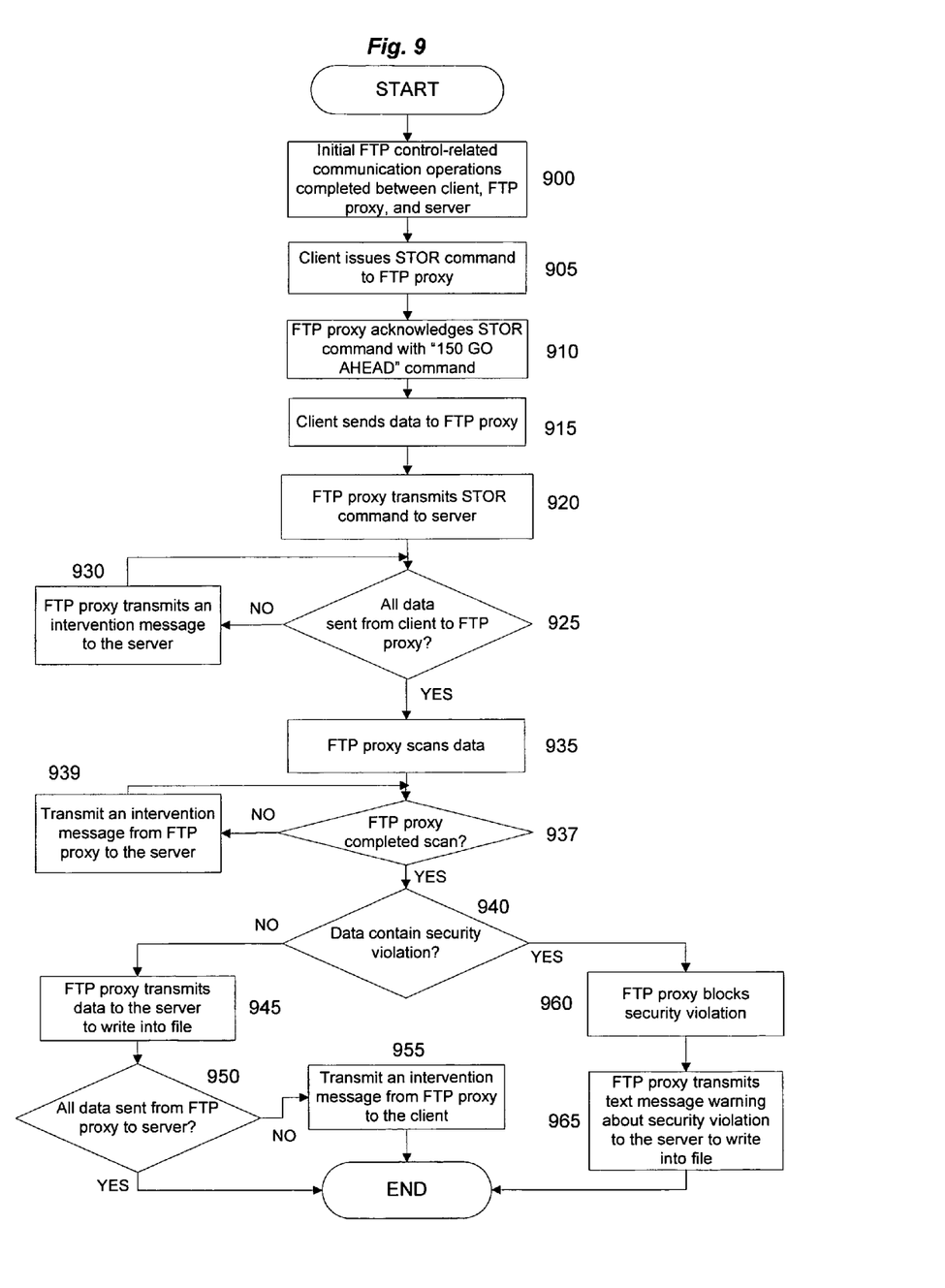
FIG. 9 is a logic flow diagram illustrating an exemplary method for avoiding unintentional time-outs for communications in a client-proxy-server environment for the FTP protocol in accordance with an alternative exemplary embodiment of the invention.

FIG. 9 is a logic flow diagram illustrating an exemplary method for avoiding unintentional time-outs for communications in a client-proxy-server environment for the FTP protocol in accordance with an alternative exemplary embodiment of the invention. In Step 900, initial FTP control-related communication operations 805 are completed between the client 135, FTP proxy 120, and server 105. Subsequently, in Step 905, the client 135 issues a STOR command 815 to the FTP proxy 120. In step 910, the FTP proxy 120 responds to the receipt of the STOR command 815 by sending the client 135 a "150 Go Ahead" command 820 on the control channel. Then, in Step 915, the client 135 begins transmitting the data 825a to the FTP proxy 120. After all the original stream of data 825a is transmitted to the FTP proxy 120 from the client 135, the FTP proxy 120 transmits the STOR command 815 to the server 105.

During Step 915, the client 135 continues to transmit the data 825a to the FTP proxy 120. In Step 925, the FTP proxy 120 determines whether it has received all of the data 825a from the client 135. If all the data 825a has not been received by the FTP proxy 120 from the client 135, the FTP proxy 120 sends an intervention message, in the form of an innocuous command 845, such as the FTP "NOOP" or "STAT" command, to the server 105 in Step 930 to prevent a server-side time-out while the server 105 is idle.

The process of transmitting an innocuous FTP command 845 from the FTP proxy 120 to the server 105 in Step 930 continues until the FTP proxy 120 has received all data traffic 825a from the client 135 for communication to the server 105 as determined in Step 925. After all the requested data traffic 825a is received from the client 135, the FTP proxy 120 completes a scan of the requested data traffic 825a in Step 935. The scan in Step 935 typically comprises an anti-virus, anti-spam, or other content filtering scan on the gateway 110.

In Step 937, the FTP proxy 120 determines whether it has completed the scan of the requested data traffic 825a. If the FTP proxy 120 has not completed the scan of the requested data traffic 825a, the FTP proxy 120 will continue transmitting an innocuous FTP command 845 from the FTP proxy 120 to the server 105 in Step 939. However, if the FTP proxy 120 has completed the scan of the requested data traffic 825a, it will determine whether the requested data 825a contains a security violation in Step 940.

If the FTP proxy 120 does not detect a security violation or virus, it will transmit the data traffic 825b to the server 105 in Step 945. To prevent client-side time-outs while transmitting the data traffic 825b to the server 105, the FTP proxy 120 determines whether it has transmitted all of the data traffic 825b to the server 105 in Step 950. If all of the data traffic 825b has not been transmitted, the FTP proxy 120 transmits an intervention message, in the form of a continuation response 835 to the client 135 at predetermined time intervals. The transmission of the continuation response 835 prevents the client 135 from timing out and prematurely terminating the data request sequence. In response to receiving the continuation response 835, the client 135 responds by resetting its time-out timer because a typical client timer is reset whenever the client 135 receives a line of data traffic.

However, if the FTP proxy 120 detects a security violation or virus in Step 940, the FTP proxy 120 can take a blocking action in Step 960 to prevent the security violation from reaching the client 135 and then sends a new and different set of data that typically comprises a text message indicating that the original data 825a was found to contain a virus or security violation in Step 965. This new data is written by the server 105 into a file.

It should be understood that the foregoing relates only to illustrative embodiments of the present invention, and that numerous changes may be made therein without departing from the scope and spirit of the invention as defined by the following claims. One of ordinary skill in the art should understand that the that the transmission of intervention messages, including extension headers, continuation responses, and innocuous commands, can be utilized by the Internet communications protocols disclosed in the application, including HTTP, POP3, and FTP protocols. Furthermore, one of ordinary skill in the art should understand that the transmission of intervention messages, including extension headers, continuation responses, and innocuous commands, can be utilized for a variety of Internet communications protocols.

The invention claimed is:

1. A computer-implemented method for avoiding unintentional client-side time-outs, comprising the steps of:
   receiving at a proxy requested data from a server;
   transmitting at least one intervention message from the proxy to a client while the proxy waits to receive the requested data from the server, the intervention message comprising content other than the requested data received from the server;
   determining at the proxy whether the requested data comprises one of a plurality of security violations; and
   transmitting at least one intervention message from the proxy to the client while determining whether the requested data comprises a security violation, the intervention message comprising content other than the requested data received from the server, wherein transmitting the at least one intervention message comprises transmitting one or more of:
   a single line of data traffic comprising content other than the requested data received from the server, that is included at the front of a mail header;
   a single line of data traffic comprising content other than the requested data received from the server, that is included within standard header fields; and
   a protocol command comprising content other than the requested data received from the server, that is unrelated to the requested data.

2. The method of claim 1 wherein the step of transmitting the intervention message comprises transmitting one or more of
- an extension header field; and
- an innocuous command.

3. The method of claim 1 wherein the step of transmitting the intervention message is performed prior to a time-out of a client reset timer.

4. The method of claim 1 further comprising the step of transmitting the requested data to the client after determining at the proxy whether the requested data comprises one of a plurality of security violations.

5. A computer-implemented method for avoiding unintentional server-side time-outs, comprising the steps of:
- receiving at a proxy requested data from a client;
- transmitting at least one intervention message from a proxy to a server while the proxy waits to receive all of the requested data from the client, wherein the intervention message is transmitted prior to a time-out of a server reset timer;
- determining at the proxy whether the requested data comprises one of a plurality of security violations; and
- transmitting at least one intervention message from the proxy to the server while determining whether the requested data comprises a security violation, the intervention message comprising content other than the requested data received from the client.

6. The method of claim 5 wherein the step of transmitting the intervention message comprises one or more of
- an extension header field;
- a continuation response; and
- an innocuous command.

7. The method of claim 5 wherein the step of transmitting the intervention message comprises transmitting one or more of
- a single line of data traffic comprising content other than the requested data received from the client, that is included at the front of a mail header;
- a single line of data traffic comprising content other than the requested data received from the client, that is included within standard header fields;
- a multi-line status response comprising content other than the requested data received from the client, that is generated by the proxy from a FTP response; and
- a protocol command comprising content other than the requested data received from the client, that is unrelated to the requested data.

8. The method of claim 5 further comprising the step of transmitting the requested data to the server after determining at the proxy whether the requested data comprises one of a plurality of security violations.

9. A system for avoiding unintentional client-side time-outs, comprising:
- a server operative to transmit requested data; and
- at least one proxy operative to
  - receive the requested data from the server,
  - to transmit at least one intervention message to a client while waiting to receive the requested data from the server and prior to a time-out of a client reset timer,
  - determine at the proxy whether the requested data comprises one of a plurality of security violations, and
  - transmit at least one intervention message from the proxy to the client while determining whether the requested data comprises a security violation, the intervention message comprising content other than the requested data received from the server.

10. The system of claim 9, wherein the intervention message transmitted by the proxy comprises one or more of
- an extension header field; and
- an innocuous command.

11. The system of claim 9, wherein the intervention message transmitted by the proxy comprises one or more of
- a single line of data traffic comprising content other than the requested data received from the server, that is included at the front of a mail header;
- a single line of data traffic comprising content other than the requested data received from the server, that is included within standard header fields; and
- a protocol command comprising content other than the requested data received from the server, that is unrelated to the requested data.

12. The system of claim 9, wherein the proxy comprises one of a HTTP proxy, a POP3 proxy, and a FTP proxy.

13. A system for avoiding unintentional server-side time-outs, comprisin
- a client operative to transmit requested data;
- at least one proxy operative to
  - receive the requested data from the client,
  - transmit at least one intervention message to a server while waiting to receive the requested data from the client, the intervention message comprising content other than requested data received from the client,
  - determine at the proxy whether the requested data comprises one of a plurality of security violations, and
  - transmit at least one intervention message from the proxy to the server while determining whether the requested data comprises a security violation, the intervention message comprising content other than the requested data received from the client.

14. The system of claim 13, wherein the intervention message transmitted by the proxy comprises one or more of
- an extension header field;
- a continuation response; and
- an innocuous command.

15. The system of claim 13, wherein the intervention message transmitted by the proxy comprises one or more of
- a single line of data traffic comprising content other than the requested data received from the client, that is included at the front of a mail header;
- a single line of data traffic comprising content other than the requested data received from the client, that is included within standard header fields;
- a multi-line status response comprising content other than the requested data received from the client, that is generated by the proxy from a FTP response; and
- a protocol command comprising content other than the requested data received from the client, that is unrelated to the requested data.

16. The system of claim 13, wherein the proxy transmits the intervention message prior to a time-out of a server reset timer.

17. The system of claim 13, wherein the proxy comprises one of a HTTP proxy, a POP3 proxy, and a FTP proxy.

* * * * *